US008904682B1

(12) United States Patent
Lavilla

(10) Patent No.: US 8,904,682 B1
(45) Date of Patent: Dec. 9, 2014

(54) COMPACT MERCHANDISE DISPLAY SYSTEM

(76) Inventor: Pablo L. Lavilla, Miami, FL (US)

( * ) Notice: Subject to any disclaimer, the term of this patent is extended or adjusted under 35 U.S.C. 154(b) by 108 days.

(21) Appl. No.: 13/550,399

(22) Filed: Jul. 16, 2012

Related U.S. Application Data

(63) Continuation-in-part of application No. 12/775,430, filed on May 6, 2010, now abandoned.

(51) Int. Cl.
*G09F 13/00* (2006.01)
*G06F 13/00* (2006.01)

(52) U.S. Cl.
CPC .................................... *G06F 13/00* (2013.01)
USPC ........................................................... 40/431

(58) Field of Classification Search
USPC .................................................. 40/431, 430
See application file for complete search history.

(56) References Cited

U.S. PATENT DOCUMENTS 1,912,899 A * 6/1933 Johannsen .................... 312/114
2,170,641 A 8/1939 Lancelot
3,292,287 A 12/1966 Marn
3,328,906 A 7/1967 Kravitt
3,738,035 A * 6/1973 Bricker ........................... 40/431
3,748,769 A 7/1973 Nolles
3,808,721 A * 5/1974 Gersch ............................ 40/432
3,964,189 A 6/1976 Belokin, Jr.
4,244,130 A 1/1981 Frois
4,490,931 A 1/1985 Fleemin
D378,265 S 3/1997 Vicard et al.
5,822,898 A 10/1998 Weissleder
D402,585 S 12/1998 Johnson et al.
5,865,516 A * 2/1999 Woy ............................. 312/125
5,894,275 A 4/1999 Swingle
5,904,257 A 5/1999 Marmet et al.
6,018,899 A 2/2000 Hanitz
6,050,010 A * 4/2000 Garcia et al. ............... 40/124.02
6,161,318 A 12/2000 Cunningham
6,253,474 B1 * 7/2001 Kramer ........................... 40/430
6,298,588 B1 10/2001 Remitz et al.
6,335,691 B1 1/2002 Bird
6,874,744 B2 4/2005 Rawlings et al.
6,929,552 B1 * 8/2005 Hargabus ........................ 472/61
2006/0150451 A1 * 7/2006 Spielberger et al. ............ 40/412
2007/0020572 A1 * 1/2007 Furner et al. .................. 431/289
2008/0204437 A1 * 8/2008 Jensen .......................... 345/207
2009/0039742 A1 * 2/2009 Ripley, Jr. ..................... 312/114
2011/0211805 A1 9/2011 Abrahamson

* cited by examiner

*Primary Examiner* — Kristina Junge

(57) ABSTRACT

A compact merchandise display system for showcasing an item has a base with a transparent or translucent cover located on a base top surface. The system has a rotating platform located on the base top surface having a first light. The system has a control system having a microprocessor, a sensor, a power supply, a power switch, a speaker, a microphone, and a memory component located in the microprocessor. A sound is recorded by the microphone and stored into the memory component of the microprocessor. Upon activation of the microprocessor via the sensor, the sound is played via the speaker, the rotating platform is energized via a platform motor, and the first light is activated.

2 Claims, 4 Drawing Sheets

COMPACT MERCHANDISE DISPLAY SYSTEM

CROSS REFERENCE

This application claims priority to U.S. non-provisional application Ser. No. 12/775,430 filed May 6, 2010 as a continuation-in-part, the specification of which is incorporated herein by reference in its entirety.

BACKGROUND OF THE INVENTION

Typical display advertising used in stores may include cases, display shelving, lettered signs, and lights. It is commonly believed that the manner in which an item is displayed in a store can make it sell more easily and command a higher sales price. The present invention features a compact merchandise display system for showcasing an item.

SUMMARY

The present invention features a compact merchandise display system for showcasing an item. In some embodiments the system comprises a base and a transparent or translucent cover located on a base top surface. In some embodiments, the system comprises a rotating platform located on the base top surface having a first light.

In some embodiments, the system comprises a control system having a microprocessor, a sensor, a power supply, a power switch, a speaker, a microphone, and a memory component located in the microprocessor. In some embodiments, a sound is recorded by the microphone and stored into the memory component of the microprocessor. In some embodiments, upon activation of the microprocessor via the sensor, the sound is played via the speaker, the rotating platform is energized via a platform motor, and the first light is activated.

In some embodiments, a compact merchandise display system is for showcasing an item.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Following is a list of elements corresponding to a particular element referred to herein:

100 Compact merchandise display system
200 Base

Figure 1:
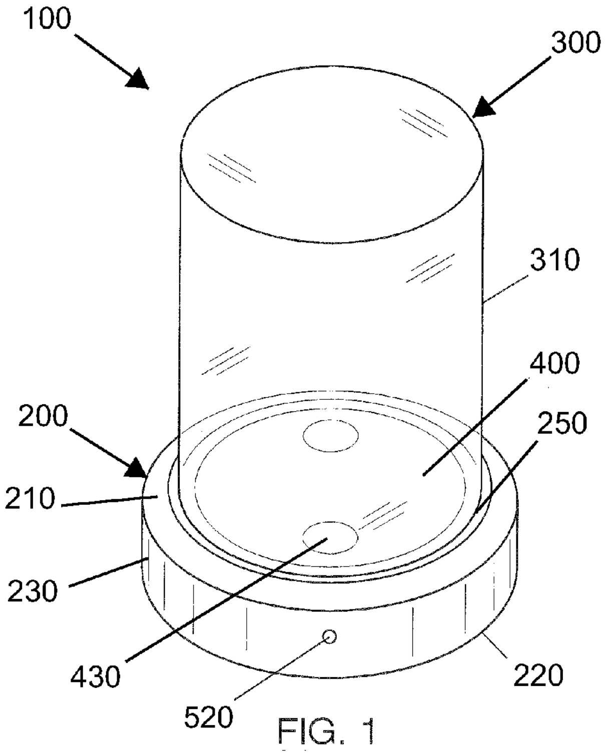
FIG. 1 is a perspective view of the present invention.
Figure 2:
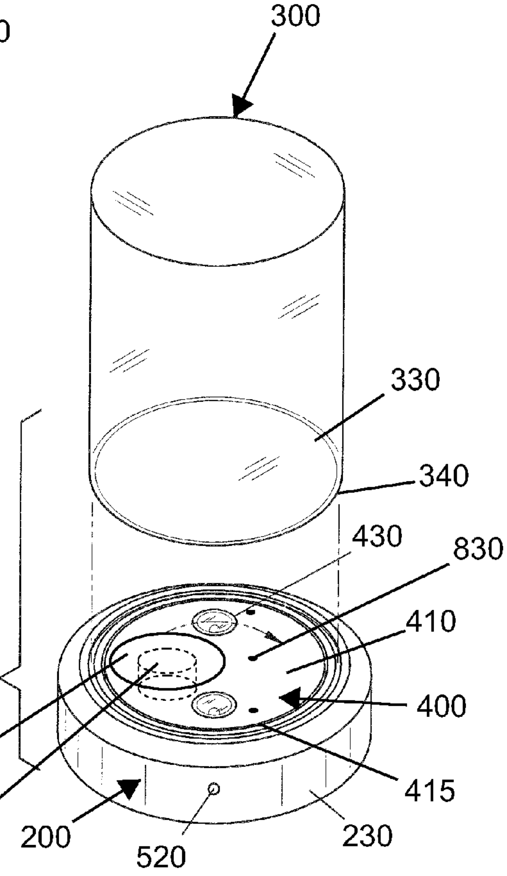
FIG. 2 is a perspective view of the present invention.
Figure 3:
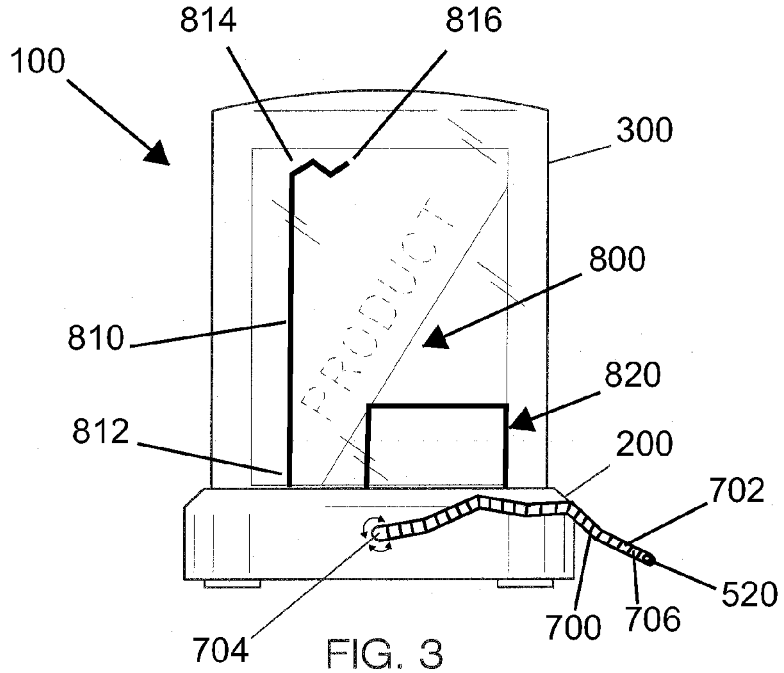
FIG. 3 is a side view of the present invention.
Figure 4:
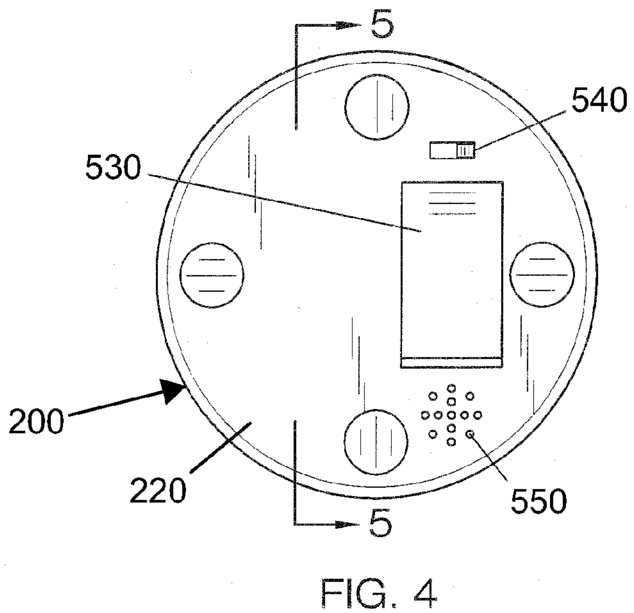
FIG. 4 is a bottom view of the present invention.
Figure 5:
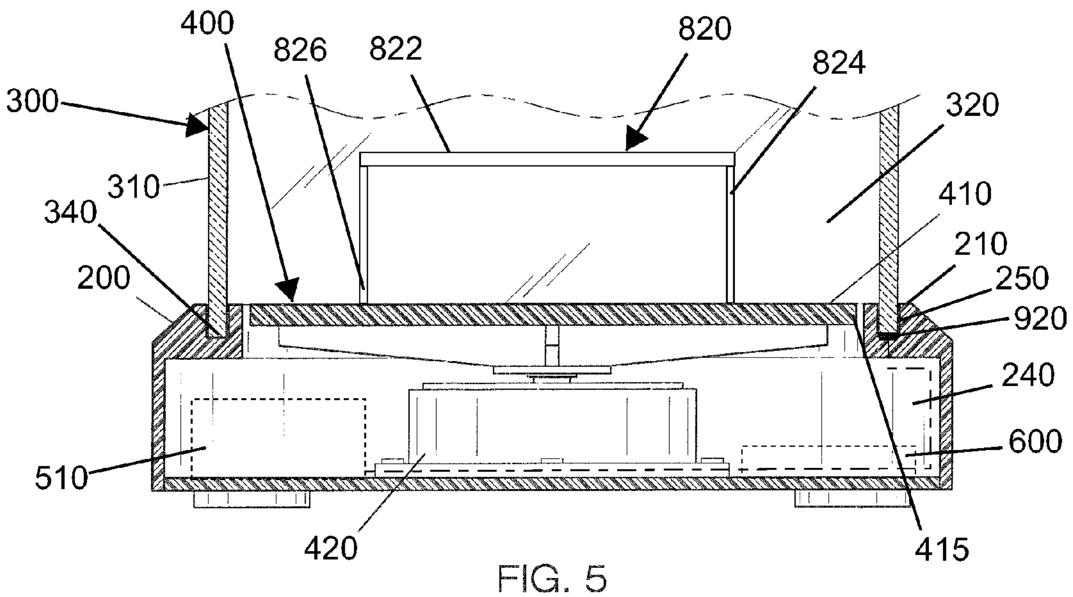
FIG. 5 is a cross-sectional view of the present invention.
Figure 6:
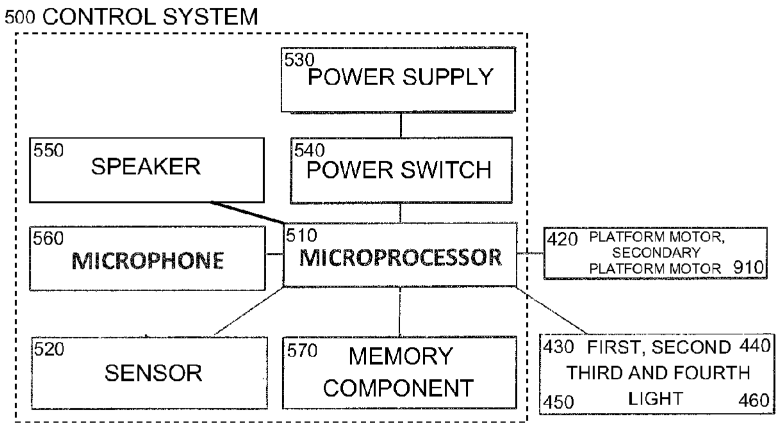
FIG. 6 is a schematic of the present invention.
Figure 7:
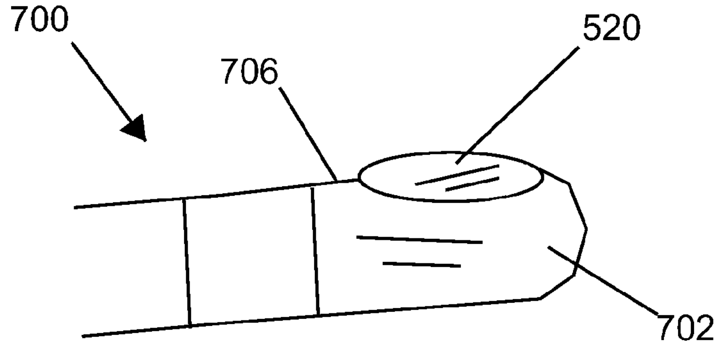
FIG. 7 is a close up view of the sensor probe of the present invention.
Figure 8:
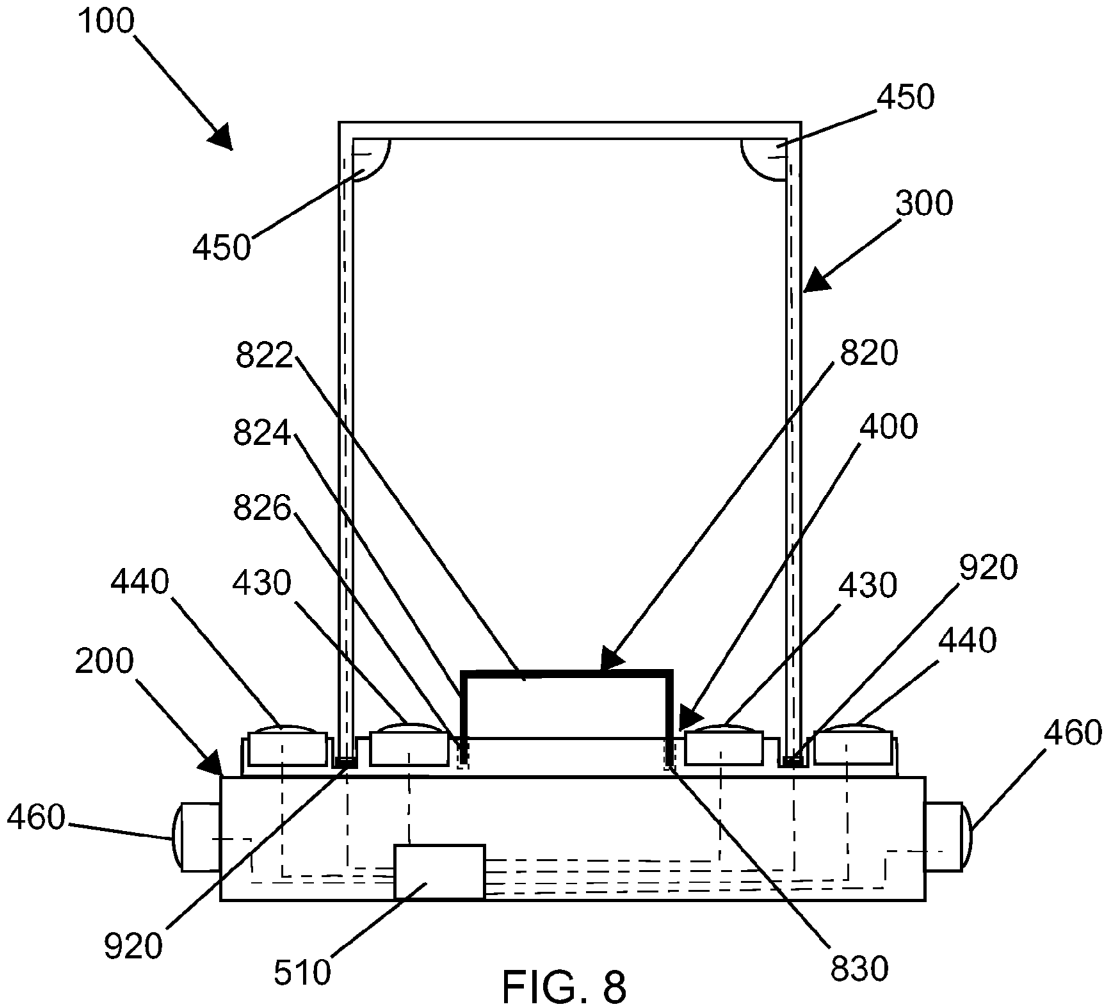
FIG. 8 is a side cross-sectional view of an alternate embodiment of the present invention.

210 Base top surface
220 Base bottom surface
230 Base side wall
240 Base inner cavity
250 Cover channel
300 Cover
310 Cover exterior surface
320 Cover inner cavity
330 Cover bottom aperture
340 Cover bottom lip
400 Rotating platform
410 Platform top surface
415 Platform outer periphery
420 Platform motor
430 First light
440 Second light
450 Third light
460 Fourth light
500 Control system
510 Microprocessor
520 Sensor
530 Power supply
540 Power switch
550 Speaker
560 Microphone
570 Memory component
600 Weight
700 Sensor probe
702 Probe first end
704 Probe second end
706 Probe side
800 Platform module system
810 Hanging rod
812 Hanging rod first end
814 Hanging rod second end
816 Hook
820 Display platform
822 Display platform top surface
824 Display platform leg
826 Display platform leg first end
830 Aperture
900 Secondary rotating platform
910 Secondary platform motor
920 Contact Referring now to FIG. 1-8, the present invention features a compact merchandise display system (100) for showcasing an item. In some embodiments, the system (100) comprises a base (200) having a base top surface (210), a base bottom surface (220), a base side wall (230), and a base inner cavity (240).

In some embodiments, the system (100) comprises a transparent or translucent cover (300) having a cover exterior surface (310), a cover inner cavity (320), a cover bottom aperture (330), and a cover bottom lip (340). In some embodiments, the cover (300) is located on the base top surface (210). In some embodiments, the cover (300) locks onto the base top surface (210).

In some embodiments, the system (100) comprises a rotating platform (400) located on the base top surface (210) having a platform motor (420) operatively coupled thereto. In some embodiments, the rotating platform (400) is entirely covered by the cover (300). In some embodiments, the cover (300) covers a part of the rotating platform (300). In some embodiments, the platform motor (420) is located in the base inner cavity (240) beneath the rotating platform (400). In some embodiments, the rotating platform (400) comprises a first light (430) located on a platform top surface (410). In some embodiments, the first light (430) is located proximal to a middle section of the rotating platform (400).

In some embodiments, the system (100) comprises a control system (500) having a microprocessor (510), a sensor (520) operatively connected to the microprocessor (510), a power supply (530) operatively connected to the microprocessor (510), a power switch (540) operatively connected to the power supply (530), a speaker (550) operatively connected to the microprocessor (510), a microphone (560) operatively connected to the microprocessor (510), and a memory component (570) located in the microprocessor (510). In some embodiments, the platform motor (420) is operatively connected to the microprocessor (510). In some embodiments, the first light (430) is operatively connected to the microprocessor (510).

In some embodiments, a sound is recorded by the microphone (560) and stored into the memory component (570) of the microprocessor (510). In some embodiments, upon activation of the microprocessor (510) via the sensor (520), the sound is played via the speaker (550), the rotating platform (400) is energized via the platform motor (420), and the first light (430) is activated.

In some embodiments, a compact merchandise display system (100) is for showcasing an item.

In some embodiments, the base (200) comprises a weight (600) located in the base inner cavity (240). In some embodiments, the weight (600) helps to stabilize the base (200) and keep it from easily tipping over.

In some embodiments, the cover (300) is removably and attachably located on the base top surface (210). In some embodiments, the cover bottom lip (340) is located in a cover channel (250). In some embodiments, the cover channel (250) is located on the base top surface (210). In some embodiments, the cover channel (250) comprises locking teeth that matably interface with locking teeth located on the cover bottom lip (340).

In some embodiments, the rotating platform (400) comprises a second light (440) located on the platform top surface (410). In some embodiments, the second light (440) is located close to a platform outer periphery (415). In some embodiments, the second light (440) is operatively connected to the microprocessor (510). In some embodiments, the second light (440) is located outside the cover (300).

In some embodiments, the rotating platform (400) comprises a plurality of second lights (440) located on the platform top surface (410). In some embodiments, the plurality of second lights (440) is located close to a platform outer periphery (415). In some embodiments, the plurality of second lights (440) is operatively connected to the microprocessor (510).

In some embodiments, the rotating platform (400) comprises a plurality of first lights (430) located on the platform top surface (410). In some embodiments, the plurality of first lights (430) is operatively connected to the microprocessor (510).

In some embodiments, the system (100) comprises a flexible segmented sensor probe (700) having a probe first end (702) and a probe second end (704). In some embodiments, the sensor probe (700) is telescopically located in the base side wall (230). In some embodiments, the sensor (520) is located on a probe side (706) of the sensor probe first end (702) to direct the sensing of the probe and shield it from other inputs. In some embodiments, the sensor probe (700) is rotationally adjustable. In some embodiments, the sensor (520) senses in a first direction. In some embodiments, the sensor (520) is blinded to sensing in a second direction opposed to the first direction.

In some embodiments, the system (100) comprises a platform module system (800) comprising a hanging rod (810), a display platform (820), and a plurality of apertures (830) located on the platform top surface (410). In some embodiments, the hanging rod (810) comprises a terminating hanging rod first end (812) and a hanging rod second end (814) having a hook (816). In some embodiments, the hanging rod first end (812) is insertably located in the aperture (830). In some embodiments, upon insertion, the hanging rod (810) projects out and away from the platform top surface (410) at a generally perpendicular angle. In some embodiments, the display platform (820) comprises a display platform top surface (822), and a display platform leg (824) having a terminating display platform leg first end (826). In some embodiments, the display platform leg first end (826) is insertably located in the aperture (830). In some embodiments, upon insertion, the display platform leg (824) projects out and away from the platform top surface (410) at a generally perpendicular angle.

In some embodiments, the first light (430) is pivotally positionable. In some embodiments, the first light (430) comprises a pivoting ball and socket mechanism.

In some embodiments, the second light (440) is pivotally positionable. In some embodiments, the second light (440) comprises a pivoting ball and socket mechanism.

In some embodiments, the rotating platform (400) located on the base top surface (210) is pivotally positionable. In some embodiments, the rotating platform (400) comprises a pivoting ball and socket mechanism.

In some embodiments, the rotating platform (400) located on the base top surface (210) is bendably flexible. In some embodiments, the rotating platform (400) can be manipulated into a shape. In some embodiments, the rotating platform (400) can retain the shape, once manipulated. In some embodiments, the rotating platform (400) is constructed from a malleable material.

In some embodiments, the rotating platform (400) comprises a secondary rotating platform (900) located on the rotating platform (400) having a secondary platform motor (910) operatively coupled thereto. In some embodiments, the secondary platform motor (910) is located beneath the rotating platform (400). In some embodiments, the secondary platform motor (910) is operatively connected to the microprocessor (510).

In some embodiments, the rotating platform (400) comprises a plurality of secondary rotating platforms (900) located thereon.

In some embodiments, a third light (450) is located on the cover (300). In some embodiments, the third light (450) is operatively connected to the microprocessor (510) via mated contacts (920) located on the cover bottom lip (340) and the base top surface (210), and wiring.

In some embodiments, a fourth light (460) is located on the base (200). In some embodiments, the fourth light (460) is operatively connected to the microprocessor (510).

In some embodiments, a compact merchandise display system (100) is for showcasing an item. In some embodiments, the system (100) comprises a base (200) having a base top surface (210), a base bottom surface (220), a base side wall (230), and a base inner cavity (240).

In some embodiments, the system (100) comprises a transparent or translucent cover (300) having a cover exterior surface (310), a cover inner cavity (320), a cover bottom aperture (330), and a cover bottom lip (340). In some embodiments, the cover (300) is removably and attachably located on the base top surface (210). In some embodiments, the cover bottom lip (340) is located in a cover channel (250). In some embodiments, the cover channel (250) is located on the base top surface (210).

In some embodiments, the system (100) comprises a rotating platform (400) located on the base top surface (210) having a platform motor (420) operatively coupled thereto. In some embodiments, the platform motor (420) is located in the base inner cavity (240) beneath the rotating platform (400). In some embodiments, the rotating platform (400) comprises one or more first lights (430) located on a platform top surface (410).

In some embodiments, the system (100) comprises a control system (500) having a microprocessor (510), a sensor (520) operatively connected to the microprocessor (510), a power supply (530) operatively connected to the microprocessor (510), a power switch (540) operatively connected to the power supply (530), a speaker (550) operatively connected to the microprocessor (510), a microphone (560) operatively connected to the microprocessor (510), and a memory component (570) located in the microprocessor (510). In some embodiments, the platform motor (420) is operatively connected to the microprocessor (510). In some embodiments, the first light (430) is operatively connected to the microprocessor (510).

In some embodiments, a sound is recorded by the microphone (560) and stored into the memory component (570) of the microprocessor (510). In some embodiments, upon activation of the microprocessor (510) via the sensor (520), the sound is played via the speaker (550), the rotating platform (400) is energized via the platform motor (420), and the first light (430) is activated.

In some embodiments, a flexible segmented sensor probe (700) has a probe first end (702) and a probe second end (704). In some embodiments, the sensor probe (700) is telescopically located in the base side wall (230). In some embodiments, the sensor (520) is located on a sensor probe side (706) of the sensor probe first end (702). In some embodiments, the sensor probe (700) is rotationally adjustable.

In some embodiments, the system (100) comprises a platform module system (800) comprising a hanging rod (810), a display platform (820), and a plurality of apertures (830) located on the platform top surface (410). In some embodiments, the hanging rod (810) comprises a terminating hanging rod first end (812) and a hanging rod second end (814) having a hook (816). In some embodiments, the hanging rod first end (812) is insertably located in the aperture (830). In some embodiments, upon insertion, the hanging rod (810) projects out and away from the platform top surface (410) at a generally perpendicular angle. In some embodiments, the display platform (820) comprises a display platform top surface (822), and a display platform leg (824) having a terminating display platform leg first end (826). In some embodiments, the display platform leg first end (826) is insertably located in the aperture (830). In some embodiments, upon insertion, the platform leg projects out and away from the platform top surface (410) at a generally perpendicular angle.

In some embodiments, a compact merchandise display system (100) is for showcasing an item.

In some embodiments, a compact merchandise display system (100) is for showcasing an item. In some embodiments, the system (100) consists of a base (200) having a base top surface (210), a base bottom surface (220), a base side wall (230), and a base inner cavity (240)

In some embodiments, the system (100) comprises a transparent or translucent cover (300) having a cover exterior surface (310), a cover inner cavity (320), a cover bottom aperture (330), and a cover bottom lip (340). In some embodiments, the cover (300) is removably and attachably located on the base top surface (210). In some embodiments, the cover bottom lip (340) is located in a cover channel (250). In some embodiments, the cover channel (250) is located on the base top surface (210).

In some embodiments, the system (100) comprises a rotating platform (400) located on the base top surface (210) having a platform motor (420) operatively coupled thereto. In some embodiments, the platform motor (420) is located in the base inner cavity (240) beneath the rotating platform (400). In some embodiments, the rotating platform (400) comprises one or more first lights (430) located on a platform top surface (410).

In some embodiments, the system (100) comprises a control system (500) having a microprocessor (510), a sensor (520) operatively connected to the microprocessor (510), a power supply (530) operatively connected to the microprocessor (510), a power switch (540) operatively connected to the power supply (530), a speaker (550) operatively connected to the microprocessor (510), a microphone (560) operatively connected to the microprocessor (510), and a memory component (570) located in the microprocessor (510). In some embodiments, the platform motor (420) is operatively connected to the microprocessor (510). In some embodiments, the first light (430) is operatively connected to the microprocessor (510).

In some embodiments, a sound is recorded by the microphone (560) and stored into the memory component (570) of the microprocessor (510). In some embodiments, upon activation of the microprocessor (510) via the sensor (520), the sound is played via the speaker (550), the rotating platform (400) is energized via the platform motor (420), and the first light (430) is activated.

In some embodiments, the sensor (520) is located on a side of a flexible segmented sensor probe (700) having a probe first end (702) and a probe second end (704). In some embodiments, the sensor probe (700) is telescopically located in the base side wall (230). In some embodiments, the sensor (520) is located on a sensor probe side (706) of the sensor probe first end (702). In some embodiments, the sensor probe (700) is rotationally adjustable.

In some embodiments, the system (100) comprises a platform module system (800) comprising a hanging rod (810), a display platform (820), and a plurality of apertures (830) located on the platform top surface (410). In some embodiments, the hanging rod (810) comprises a terminating hanging rod first end (812) and a hanging rod second end (814) having a hook (816). In some embodiments, the hanging rod first end (812) is insertably located in the aperture (830). In some embodiments, upon insertion, the hanging rod (810) projects out and away from the platform top surface (410) at a generally perpendicular angle. In some embodiments, the display platform (820) comprises a display platform top surface (822), and a display platform leg (824) having a terminating display platform leg first end (826). In some embodiments, the display platform leg first end (826) is insertably located in the aperture (830). In some embodiments, upon insertion, the display platform leg (824) projects out and away from the platform top surface (410) at a generally perpendicular angle.

In some embodiments, a compact merchandise display system (100) is for showcasing an item.

As used herein, the term "about" refers to plus or minus 10% of the referenced number. For example, an embodiment wherein the hanging rod is about 10 inches in length includes a hanging rod that is between 9 and 11 inches in length.

The disclosures of the following U.S. Patents are incorporated in their entirety by reference herein: U.S. Pat. Pub. No. 2011/0211805 A1; U.S. Pat. No. 2,170,641; U.S. Pat. No. 3,292,287; U.S. Pat. No. 5,822,898; U.S. Pat. No. 5,904,257.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A compact merchandise display system (100) for showcasing an item, wherein said system (100) comprises:

(a) a base (200) having a base top surface (210), a base bottom surface (220), a base side wall (230), and a base inner cavity (240);

(b) a transparent or translucent cover (300) having a cover exterior surface (310), a cover inner cavity (320), a cover bottom aperture (330), and a cover bottom lip (340), wherein the cover (300) is attachably disposed on the base top surface (210), wherein the cover bottom lip (340) is disposed in a cover channel (250), wherein the cover channel (250) is disposed on the base top surface (210), the channel has three sides and an open top;

(c) a rotating platform (400) disposed on the base top surface (210) having a platform motor (420) operatively coupled thereto, wherein the platform motor (420) is disposed in the base inner cavity (240) beneath the rotating platform (400), wherein the rotating platform (400) comprises a first light (430) disposed directly on a platform top surface (410);

(d) a control system (500) having a microprocessor (510), a sensor (520) operatively connected to the microprocessor (510), a power supply (530) operatively connected to the microprocessor (510), a power switch (540) operatively connected to the power supply (530), a speaker (550) operatively connected to the microprocessor (510), a microphone (560) operatively connected to the microprocessor (510), and a memory component (570) disposed in the microprocessor (510), wherein the platform motor (420) is operatively connected to the microprocessor (510), wherein the first light (430) is operatively connected to the microprocessor (510), wherein a sound is recorded by the microphone (560) and stored into the memory component (570) of the microprocessor (510), wherein upon activation of the microprocessor (510) via the sensor (520), the sound is played via the speaker (550), the rotating platform (400) is energized via the platform motor (420), and the first light (430) is activated, wherein the first light (430) is pivotally positionable, wherein a compact merchandise display system (100) is for showcasing an item.

2. A compact merchandise display system (100) for showcasing an item, wherein said system (100) comprises:

(a) a base (200) having a base top surface (210), a base bottom surface (220), a base side wall (230), and a base inner cavity (240);

(b) a transparent or translucent cover (300) having a cover exterior surface (310), a cover inner cavity (320), a cover bottom aperture (330), and a cover bottom lip (340), wherein the cover (300) is attachably disposed on the base top surface (210), wherein the cover bottom lip (340) is disposed in a cover channel (250), wherein the cover channel (250) is disposed on the base top surface (210), the channel has three sides and an open top;

(c) a rotating platform (400) disposed on the base top surface (210) having a platform motor (420) operatively coupled thereto, wherein the platform motor (420) is disposed in the base inner cavity (240) beneath the rotating platform (400), wherein the rotating platform (400) comprises a first light (430) disposed directly on a platform top surface (410);

(d) a control system (500) having a microprocessor (510), a sensor (520) operatively connected to the microprocessor (510), a power supply (530) operatively connected to the microprocessor (510), a power switch (540) operatively connected to the power supply (530), a speaker (550) operatively connected to the microprocessor (510), a microphone (560) operatively connected to the microprocessor (510), and a memory component (570) disposed in the microprocessor (510), wherein the platform motor (420) is operatively connected to the microprocessor (510), wherein the first light (430) is operatively connected to the microprocessor (510), wherein a sound is recorded by the microphone (560) and stored into the memory component (570) of the microprocessor (510), wherein upon activation of the microprocessor (510) via the sensor (520), the sound is played via the speaker (550), the rotating platform (400) is energized via the platform motor (420), and the first light (430) is activated, wherein the rotating platform (400) comprises a second light (440) disposed on the platform top surface (410), wherein the second light (440) is disposed close to a platform outer periphery (415), wherein the second light (440) is operatively connected to the microprocessor (510), wherein the second light (440) is pivotally positionable, wherein a compact merchandise display system (100) is for showcasing an item.

* * * * *